United States Patent

(12) United States Patent
Goto et al.

(10) Patent No.: US 6,387,509 B1
(45) Date of Patent: *May 14, 2002

(54) GLASS-CERAMIC SUBSTRATE FOR A MAGNETIC INFORMATION RECORDING MEDIUM

(75) Inventors: Naoyuki Goto, Sagamihara; Kousuke Nakajima, Samukawa-machi, both of (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/253,963

(22) Filed: Feb. 22, 1999

(30) Foreign Application Priority Data

Mar. 3, 1998 (JP) ............................................ 10-067741
Dec. 8, 1998 (JP) ............................................ 10-348527

(51) Int. Cl.$^7$ .......................... C03C 10/12; B32B 17/06
(52) U.S. Cl. ........................ 428/426; 428/432; 428/701; 428/702; 501/4; 501/7; 501/10
(58) Field of Search .................. 501/4, 7, 10; 428/432, 428/701, 702, 426

(56) References Cited

U.S. PATENT DOCUMENTS

| | | | |
|---|---|---|---|
| 5,094,897 A | * | 3/1992 | Morita et al. |
| 5,336,643 A | * | 8/1994 | Goto et al. |
| 5,561,089 A | * | 10/1996 | Ishizaki et al. |
| 5,788,731 A | | 8/1998 | Suzuki et al. |
| 5,972,816 A | * | 10/1999 | Goto |

FOREIGN PATENT DOCUMENTS

EP          0587979           3/1994

OTHER PUBLICATIONS

Japanese Abstract Patent Application Publication No. 61–287032.
Japanese Abstract Patent Application Publication No. 62–284085.
Japanese Abstract Patent Application Publication No. 7–29170.
Japanese Abstract Patent Application Publication No. 7–157331.
Japanese Abstract Patent Application Publication No. 7–300340.
Japanese Abstract Patent Application Publication No. 63–46622.
Japanese Abstract Patent Application Publication No. 8–339536.
Japanese Abstract Patent Application Publication No. 2–292717.
European Search Report, The Hague, Jun. 22, 1999, Examiner Klocke, S.
Patent Abstracts of Japan, vol. 097, No. 008, Aug. 29, 1997, No. 09102125.

* cited by examiner

*Primary Examiner*—Deborah Jones
*Assistant Examiner*—Jennifer McNeil
(74) *Attorney, Agent, or Firm*—Hedman & Costigan, P.C.

(57) ABSTRACT

A glass-ceramic substrate for a magnetic information recording medium contains, as a main crystal phase or phases, one or more crystal phases selected from the group consisting of $\beta$-quartz ($\beta$-$SiO_2$), $\beta$-quartz solid solution ($\beta$-$SiO_2$ solid solution), $\beta$-spodumene ($\beta$-$Li_2O.Al_2O_3.4SiO_2$), $\beta$-spodumene solid solution ($\beta$-$Li_2O.Al_2O_3.4SiO_2$ solid solution), $\beta$-eucryptite ($\beta$-$Li_2O.Al_2O_3.2SiO_2$, a part of $Li_2O$ being capable of being substituted by MgO and/or ZnO) and $\beta$-eucryptite solid solution ($\beta$-$Li_2O.Al_2O_3.2SiO_2$ solid solution, a part of $Li_2O$ being capable of being substituted by MgO and/or ZnO). Alternatively, the glass-ceramic contains, as a main crystal phase or phases, gahnite ($ZnAl_2O_4$) and/or gahnite solid solution ($ZnAl_2O_4$ solid solution). The glass-ceramic substrate has a high heat resisting property and a super flat surface capable of achieving a high recording density according to the perpendicular magnetic recording.

10 Claims, No Drawings

GLASS-CERAMIC SUBSTRATE FOR A MAGNETIC INFORMATION RECORDING MEDIUM

BACKGROUND OF THE INVENTION

This invention relates to a glass-ceramic substrate for a magnetic information recording medium used for recording various types of information and, more particularly, to a magnetic information recording disk suitable for perpendicular recording having a high heat resisting property which will enable film forming at a high temperature and also annealing at a high temperature, super flatness of the surface of the substrate, and a low degree of elution of alkali ingredients from the substrate during film forming and annealing processes conducted at a high temperature. In this specification, the term "magnetic information recording medium" means a magnetic information recording medium in the form of a disk and includes fixed type hard disks, removable type hard disks and card type hard disks used respectively for so-called hard disks for personal computers and other magnetic information recording medium in the form of a disk which can be used for storage of data in, e.g., digital video cameras and digital cameras.

In recently developed magnetic information recording devices which handle data of a large amount such as data of a moving image or voice which is necessitated by developments of personal computers for multi-media purposes and digital video cameras and digital cameras, recording density of a magnetic information recording medium has reached an extremely high recording density exceeding 1 Gb/in$^2$.

Conventional magnetic information recording devices mostly employ the longitudinal magnetic recording system according to which magnetization (i.e., recording) is made in the longitudinal direction. In these conventional devices, however, wavelength of recording, track width and film thickness of a recording medium are reduced as the recording density increases and this causes decrease in magnetic energy of a magnetic material constituting 1 bit resulting in decrease in the signal output level and increase in the signal-to-noise ratio. When the recording density exceeds 10 Gb/in$^2$, there arises a further problem that such a small magnetization gives rise to thermal instability and thereby causes difficulty in the magnetic recording.

In contrast, according to the perpendicular magnetic recording system in which the easy axis of magnetization is perpendicular, the bit size can be significantly reduced and, by capability of having a desired film thickness of a magnetic recording medium (five-fold to ten-fold of the film thickness used in the case of the longitudinal recording system), reduction of the diamagnetic field and an advantageous result caused by the shape magnetic anisotropy can be expected. Thus, according to the perpendicular recording system, the decrease in the recording energy and the problem of thermal instability which are caused in increasing the recording density in the conventional longitudinal recording system can be eliminated and a significant improvement in the recording density over the longitudinal recording system can be realized. For these reasons, recording density of 20 Gb/in$^2$ or over can be easily achieved and study for realizing recording density of 100 Gb/in$^2$ has already been started.

Since magnetization is made in the perpendicular direction with respect to the surface of a recording medium in the perpendicular recording system, a recording medium having the easy axis of magnetization extending in the perpendicular direction is employed instead of a recording medium used in the longitudinal recording system which has the easy axis extending in the longitudinal direction. The most hopeful candidate for a perpendicular magnetic film is a barium ferrite film and other materials which are considered suitable for the perpendicular magnetic film are alloy films including films of Co-$\gamma$Fe$_2$O$_3$ alloy, Co alloys, Fe alloys and Ni alloys.

A substrate suitable for the recording medium used for the new technique which is different from the conventional longitudinal recording system is required to have the following properties:

(1) An oxide medium such as barium ferrite requires film forming at a high temperature for minimization and growth in the perpendicular direction of crystal grains of the magnetic substance. Further, a recent study has revealed that there is a case where a recording medium should be annealed at a high temperature of 500° C. to 900° C. Therefore, the substrate material must stand such a high temperature without causing deformation of the substrate or change in the surface roughness.

(2) As the recording density increases in the perpendicular recording system, there is an increasing tendency toward lowering of the glide height of a magnetic head to 0.025 μm or below and there is also a tendency toward employing the near contact recording system or the contact recording system. On the other hand, for utilizing the surface of a recording medium effectively as a data zone, the ramp loading system which does not provide the landing zone as opposed to the currently employed recording system which provides both the landing zone and the data zone attracts the attention of the industry. For coping with these tendencies, the data zone on the disk surface or the entire surface of the substrate must be formed in a super flat surface for enabling such low glide height or even contact recording of the magnetic head.

(3) A substrate for a perpendicular magnetic information recording medium must be free of crystal anisotropy, foreign matters and impurities which adversely affect crystals of the material formed into a film. The substrate must also have a dense, uniform and fine texture.

(4) As the recording density increases in a perpendicular magnetic information recording medium, a magnetic film of a higher precision and a finer texture is required. If Na$_2$O, K$_2$O or an ingredient having an OH group is included in the material of the recording medium, ion of such ingredient diffuses during the film forming process resulting in increased coarseness of grains of the film and deterioration in orientation. The substrate therefore should not substantially contain such ingredients. Further, the substrate should not substantially contain PbO which is undesirable from the viewpoint of environment protection.

(5) The substrate should have sufficient chemical durability for standing rinsing and etching with various chemical reagents.

(6) As the recording density increases in a perpendicular magnetic information recording medium, the bit density and track density increase. As the size of the bit cell is reduced, a coefficient of thermal expansion of the substrate has a great influence. Therefore, a coefficient of thermal expansion within a temperature range from −50° C. to +600° C. must be within a range from −10×10$^{-7}$/° C. to 80×+10$^{-7}$/° C.

As a material for a magnetic disk substrate, aluminum alloy has been conventionally used. The aluminum alloy, however, tends to produce a substrate surface having projections or spot-like projections and depressions during the polishing process. As a result, the aluminum alloy substrate is not sufficient in flatness and smoothness as a substrate for the perpendicular magnetic information recording medium. Further, since the aluminum alloy is a soft material and tends to be easily deformed, it is difficult to form into a thin disk. Furthermore, a head crash is likely to occur during a high speed rotation of the disk due to flexion of the disk which will damage the recording medium. Therefore, the aluminum alloy is not a material which can sufficiently cope with the tendency toward the high recording density. Moreover, since the heat resisting temperature of the aluminum alloy during the film forming process which is the most important factor as the substrate for the perpendicular recording system is only 300° C. or below, film forming at a temperature above 500° C. or annealing at a temperature within a range from 500° C. to 900° C. will cause thermal deformation in the substrate so that application of the aluminum alloy to a substrate for a perpendicular magnetic information recording medium requiring a high temperature processing is difficult.

As materials for overcoming the above problems of the aluminum alloy substrate, known in the art are chemically tempered glasses such as soda-lime glass ($SiO_2$—CaO—$Na_2O$) and alumino-silicate glass ($SiO_2$—$Al_2O_3$—$Na_2O$). These materials, however, have the following disadvantages:

(1) Since polishing is made after the chemical tempering process, the chemically tempered layer is seriously instable in making the disk thinner and, moreover, the substrate has a low heat resisting property. That is, flatness measured by a specific method of a recording medium made by forming a film of a perpendicular magnetic recording material on a sample of a chemically tempered glass substrate at a high temperature of 500° C. or over exhibits a large value exceeding 5 μm. Therefore, there will occur problems of deformation after the film forming process and change in the quality of the chemically tempered layer and untempered layer, (2) Since the glass contains $Na_2O$ or $K_2O$ ingredient as an essential ingredient, the glass has the problem that elution of Na ion or K ion from the substrate into the recording material takes place during the film forming process and a barrier coating over the entire surface of the glass becomes necessary for prevention of Na ion or K ion. This prevents stable production of the product at a competitive cost.

Aside from the aluminum alloy substrate and chemically tempered glass substrate, known in the art are some glass-ceramic substrates. For example, Japanese Patent Application Laid-open Publication No. Hei 6-329440 discloses a glass-ceramic of a $SiO_2$—$Li_2O$—MgO—$P_2O_5$ system containing lithium disilicate ($Li_2O.2SiO_2$) and α-quartz (α-$SiO_2$) as main crystal phases. This glass-ceramic is an excellent material as a material textured over the entire surface in which, by controlling the grain diameter of globular crystal grains of α-quartz, the conventional mechanical texturing or chemical texturing can be omitted and the surface roughness after polishing (Ra) can be controlled within a range from 15 Å to 50 Å. This glass-ceramic, however, cannot sufficiently cope with the requirement for the low glide height necessitated by the rapidly increasing recording density which requires the surface roughness of 1 Å–5 Å. Further, this glass-ceramic has not sufficient heat resisting property. That is, flatness of the glass-ceramic substrate measured by a specific method after subjecting it to a high temperature environment (500° C. or over for 5 minutes or over) is larger than 5μm. There arise, therefore, problems of deformation of the substrate after film forming or annealing and change in the surface roughness.

Japanese Patent Application Laid-open Publication No. Hei 7-169048 discloses a photo-sensitive glass-ceramic made of a $SiO_2$—$Li_2O$ system added with Au and Ag and Japanese Patent Application Laid-open Publication No. Hei 9-35234 discloses a glass-ceramic for a magnetic disk made of a $SiO_2$—$Al_2O_3$—$Li_2O$ system and containing lithium disilicate ($Li_2O.2SiO_2$) and β-spodumene ($Li_2O.Al_2O_3.4SiO_2$). These glass-ceramics, however, have, like the above described glass-ceramic, a low heat resisting property. That is, flatness of the glass-ceramic substrates measured by a specific method after subjecting them to a high temperature environment (500° C. or over for 5 minutes or over) is larger than 5 μm. There arise, therefore, the problems of deformation of the substrates after film forming or annealing and change in the surface roughness.

U.S. Pat. No. 5,336,643 discloses low expansion transparent glass-ceramics of a $SiO_2$—$Al_2O_3$—$Li_2O$ system and U.S. Pat. No. 5,028,567 discloses glass-ceramics of a $SiO_2$—$Al_2O_3$—ZnO system. None of these publications considers or suggests the heat resisting property required for a substrate for a perpendicular magnetic information recording medium, namely flatness measured by a specific method after subjecting the substrate to a predetermined temperature environment (500° C. or over at 5 minutes or over). Particularly, none of these publications discusses the importance of maintaining a super flat substrate surface after film forming or annealing at a high temperature.

It is, therefore, an object of the invention to provide a glass-ceramic substrate for a magnetic information recording medium which can overcome the above described disadvantages of the prior art substrates and has a high heat resisting property and a super flat surface capable of coping with a high recording density according to the perpendicular recording system in future.

SUMMARY OF THE INVENTION

Accumulated studies and experiments made by the inventors of the present invention for achieving the above described objects of the invention have resulted in the finding, which has led to the present invention, that, in glass-ceramics containing a specific crystal phase or phases as a main crystal phase or phases, a glass-ceramic substrate for a magnetic information recording medium can be found which substrate has flatness of 5 μm or below as measured by a specific method and a coefficient of thermal expansion within a range from $-10 \times 10^{-7}$/° C. to $+80 \times 10^{-7}$/° C. within a temperature range from $-50°$ C. to $+600°$ C., has fine crystal grains having a diameter within a range from 0.001 μm to 0.10 μm, has a super flat surface after polishing, and has no likelihood of diffusion of Na ion or K ion and that this glass-ceramic substrate is by far superior to the prior art substrates for achieving the object of the invention.

For achieving the above described object of the invention, there is provided a glass-ceramic substrate for a magnetic information recording medium having flatness of 5 μm or below in a state after the substrate is heated to 500° C., held for 5 minutes and then cooled.

In one aspect of the invention, the glass-ceramic substrate has a coefficient of thermal expansion within a range from $-10 \times 10^{-7}$/° C. to $+80 \times 10^{-7}$/° C. within a temperature range from $-50°$ C. to $+600°$ C.

In another aspect of the invention, the glass-ceramic substrate has a surface roughness Ra (arithmetic mean roughness) within a range from 1 Å to 5 Å after polishing and Rmax (maximum roughness) of 100 Å or below after polishing.

In another aspect of the invention, there is also provided a glass-ceramic substrate wherein crystal grains of a crystal phase grown therein have a diameter within a range from 0.001 $\mu$m to 0.10 $\mu$m.

In another aspect of the invention, the glass-ceramic substrate contains, as a main crystal phase or phases, one or more crystal phases selected from the group consisting of β-quartz (β-$SiO_2$), β-quartz solid solution (β-$SiO_2$ solid solution), β-spodumene (β-$Li_2O.Al_2O_3.4SiO_2$), β-spodumene solid solution (β-$Li_2O.Al_2O_3$. $4SiO_2$ solid solution), β-eucryptite (β-$Li_2O.Al_2O_3.2SiO_2$, a part of $Li_2O$ being a capable of being substituted by MgO and/or ZnO) and β-eucryptite solid solution (β-$Li_2O.Al_2O_3.2SiO_2$ solid solution, a part of $Li_2O$ being capable of being substituted by MgO and/or ZnO).

In another aspect of the invention, the glass ceramic substrate contains, as a main crystal phase, gahnite ($ZnAl_3O_4$) and/or gahnite solid solution ($ZnAl_3O_4$ solid solution).

The glass-ceramic substrate may be free of PbO, $Na_2O$ and $K_2O$

In another aspect of the invention, the glass-ceramic substrate is provided by heat treating a base glass having a composition which consists in weight percent of:

| | |
|---|---|
| $SiO_2$ | 50–62% |
| $P_2O_5$ | 5–10% |
| $Al_2O_3$ | 22–26% |
| $Li_2O$ + MgO + ZnO | 4–6.5% |
| in which $Li_2O$ | 3–5% |
| MgO | 0.5–2% |
| ZnO | 0.2–2% |
| CaO + BaO | 0.8–5% |
| in which CaO | 0.3–4% |
| BaO | 0.5–4% |
| $TiO_2$ | 1–4% |
| $ZrO_2$ | 1–4% |
| $As_2O_3$ + $Sb_2O_3$ | 0–4% |

| | |
|---|---|
| ZnO | 0.2–2% |
| CaO + BaO | 0.8–5% |
| in which CaO | 0.3–4% |
| BaO | 0.5–4% |
| $TiO_2$ | 1–4% |
| $ZrO_2$ | 1–4% |
| $As_2O_3$ + $Sb_2O_3$ | 0–4% | and is substantially free of PbO, $Na_2O$ and $K_2O$, said glass-ceramic substrate containing, as a main crystal phase or phases, one or more crystal phases selected from the group consisting of β-quartz (β-$SiO_2$), β-quartz solid solution (β-$SiO_2$ solid solution), β-spodumene (β-$Li_2O.Al_2O_3.4SiO_2$), β-spodumene solid solution (β-$Li_2O.Al_2O_3.4SiO_2$ solid solution), P-eucryptite β-$Li_2O$. $Al_2O_3$. $2SiO_2$, a being capable of being substituted by MgO and/or ZnO) and β-eucryptite solid solution (β-$Li_2O$ * $Al_2O_3.2SiO_2$ solid solution, a part of $Li_2O$ being capable of being substituted by MgO and/or ZnO).

In another aspect of the invention, the glass-ceramic substrate is provided by heat treating a base glass having a composition which consists in weight percent of:

| | |
|---|---|
| $SiO_2$ | 30–65% |
| $Al_2O_3$ | 5–35% |
| ZnO | 5–35% |
| MgO | 1–20% |
| $TiO_2$ | 1–15% |
| CaO + SrO + BaO + $B_2O_3$ + $La_2O_3$ + $Y_2O_3$ + $Gd_2O_3$ + $Ta_2O_5$ + $Nb_2O_5$ + $WO_3$ + $Bi_2O_3$ | 0.5–20% |
| in which $B_2O_3$ | 0–10% |
| $Ta_2O_5$ + $Nb_2O_5$ + $WO_3$ + $Bi_2O_3$ | 0–10% |
| $ZrO_2$ + $P_2O_5$ + $SnO_2$ | 0–7% |
| in which $ZrO_2$ | 0 to less than 2% |
| $P_2O_5$ | 0–5% |
| $SnO_2$ | 0–2% |
| $As_2O_3$ + $Sb_2O_3$ | 0–4% | and is substantially free of PbO, $Na_2O$ and $K_2O$, said glass ceramic substrate containing, as a main crystal phase, gahnite ($ZnAl_3O_4$) and/or gahnite solid solution ($ZnAl_3O_4$).

In another aspect of the invention, the glass-ceramic substrate is provided by melting glass materials, forming molten glass, annealing formed glass and heat treating the formed glass at a nucleation temperature within a range from 650° C. to 750° C. and a crystallization temperature within a range from 750° C. to 950° C., said glass-ceramic substrate having a coefficient of thermal expansion within a range from $-10\times10^{-7}/°$ C. to $+20\times10^{-7}/°$ C. within a temperature range from −50° C. to +600° C.

In another aspect of the invention, the glass-ceramic substrate is provided by melting glass materials, forming molten glass, annealing formed glass and heat treating the formed glass at a nucleation temperature within a range from 650° C. to 750° C. and a crystallization temperature within a range from 750° C. to 950° C., said glass-ceramic substrate having a coefficient of thermal expansion within a range from $+35\times10^{-7}/°$ C. to $+80\times10^{-7}/°$ C. within a temperature range from −50° C. to +600° C.

In still another aspect of the invention, there is also provided a magnetic information recording disk provided by forming a magnetic film on a glass-ceramic substrate as described above in a state where the glass-ceramic substrate is heated at a temperature within a range from 500° C. to 900° C. and annealing the glass-ceramic substrate if necessary, said magnetic information recording disk having flatness of 5 $\mu$m or below.

DETAILED DESCRIPTION OF THE INVENTION

Reasons for limiting the physical properties, main crystal phases and crystal grain diameter, surface characteristics and composition of the glass-ceramics will now be described. The composition of the glass-ceramics is expressed on the basis of composition of oxides as in their base glass.

The heat resisting property will be described first. As described previously, when a magnetic medium made of an oxide such as barium ferrite which is considered suitable for a perpendicular magnetic recording medium is formed into a film on a substrate, temperature of the substrate often rises to 500° C. or over. Besides, there is a case where the substrate formed with a film is subjected to annealing at a temperature within a range from about 500° C. to about 900° C. Deformation or structural change in the crystal phase or crystal grain diameter, therefore, should not take place in the substrate at such temperature. More specifically, it has been found that flatness of the substrate which is measured by a touch needle type measuring instrument after the substrate is heated 500° C., held for 5 minutes and then cooled must be 5 µm or below. The flatness of the substrate should preferably be 3 µm and more preferably be 1 µm. The small value of flatness should preferably be maintained even after heating at a higher temperature for a longer period of time. Preferably, the flatness of the small value should be maintained in a state after the substrate is heated to 500° C. and held for 10 minutes, more preferably in a state after the substrate is heated to 600° C. and held for 10 minutes and even more preferably, in a state after the substrate is heated to 700° C. or 800° C. and held for 10 minutes.

Description will now be made about the coefficient of thermal expansion. As described above, the film forming temperature for a magnetic recording medium made of an oxide is so high that a problem relating to a coefficient of thermal expansion in addition to the problem of deformation and structural change must be overcome. Increase in the coefficient of thermal expansion causes deformation or expansion/contraction of the medium during and after the film forming process which in turn causes change in the magnetic properties and coming off of the recording medium from the substrate. In addition, conditions under which a perpendicular magnetic recording medium is used are veried and, accordingly, the coefficient of thermal expansion of the substrate must be maintained within a substantially constant range over a temperature range from a low temperature to a high temperature. It has been found that the substrate should have a coefficient of thermal expansion within a range from $-10 \times 10^{-7}/°$ C. to $+80 \times 10^{-7}/°$ C. within a temperature range from $-50°$ C. to $+600°$ C. The coefficient should preferably be $-5 \times 10^{-7}/°$ C. to $+70 \times 10^{-7}/°$ C. and, more preferably, be $-3 \times 10^{-7}/°$ C. to $+60 \times 10^{-7}/°$ C.

Description will now be made about surface roughness. As the recording density is improved as described above, the glide height of the magnetic head must be reduced. The glide height has recently been reduced to 0.025 µm or below and will be further reduced to 100 Å or below and further to the near contact recording glide height. Particularly, in the ramp loading system which is suited to the high recording density, the tendency toward a lower glide height is remarkable. For these reasons, it has been found that, for realizing a lower glide height of the magnetic head, the surface roughness (Ra) of the substrate after polishing should be within a range from 1 Å to 5 Å. If the surface roughness is larger than this, a desired glide height of the magnetic head in the high recording density cannot be achieved whereas if the surface roughness is smaller than this, suction between the magnetic head and the recording medium increases to such a degree as to cause damage to the recording medium.

For realizing the above described surface roughness of the substrate after polishing, it has been found that crystal grains of a crystal phase grown in the substrate should have a diameter within a range from 0.001 µm to 0.10 µm. If the grain diameter exceeds 0.10 µm or is less than 0.001 µm, a desired surface roughness cannot be attained. The grain diameter should preferably be within a range from 0.001 µm to 0.07 µm and, more preferably, within a range from 0.001 µm to 0.05 µm.

Description will now be made about crystal phases grown in the substrate. The main crystal phase is an important factor which influences the coefficient of thermal expansion. If a base glass having a coefficient of thermal expansion of a positive value is used, it is necessary to cause a crystal phase having a coefficient of thermal expansion of a negative value to grow in the substrate so that a coefficient of thermal expansion within a desired range as a whole will be realized. A main crystal phase or phases for realizing this objective is one or more crystal phases selected from the group consisting of β-quartz (β-$SiO_2$), β-quartz solid solution (β-$SiO_2$ solid solution), β-spodumene (β-$Li_2O.Al_2O_3.4SiO_2$), β-spodumene solid solution (β-$Li_2O.Al_2O_3.4SiO_2$ solid solution), β-eucryptite (β-$Li_2O.Al_2O_3.2SiO_2$, a part of $Li_2O$ being capable of being substituted by MgO and/or ZnO) and β-eucryptite solid solution (β-$Li_2O.Al_2O_3.2SiO_2$ solid solution, a part of $Li_2O$ being capable of being substituted by MgO and/or ZnO), or gahnite ($ZnAl_2O_4$) and/or gahnite solid solution ($ZnAl_2O_4$ solid solution).

As to the main crystal phase or phases which is one or more crystal phases selected from the group consisting of β-quartz (β-$SiO_2$), β-quartz solid solution (β-$SiO_2$ solid solution), β-spodumene (β-$Li_2O.Al_2O_3.4SiO_2$), β-spodumene solid solution (β-$Li_2O.Al_2O_3.4SiO_2$ solid solution), β-eucryptite (β-$Li_2O.Al_2O_3.2SiO_2$, a part of $Li_2O$ being capable of being substituted by MgO and/or ZnO) and β-eucryptite solid solution (β-$Li_2O.Al_2O_3.2SiO_2$ solid solution, a part of $Li_2O$ being capable of being substituted by MgO and/or ZnO), growth and ratio of one or more crystal phases selected from β-quartz, β-spodumene and β-eucryptite are determined by the ratio of amounts of $Li_2O$, $Al_2O_3$ and $SiO_2$ in a specific composition range, and growth and ratio of one or more of these crystal phases β-quartz, β-spodumene and β-eucryptite and one or more of the solid solution or solid solutions of these crystals are determined by the amounts of the other ingredients in the specific composition range. Growth and ratio of gahnite and/or gahnite solid solution are determined by the amounts of the ingredients other than ZnO and $Al_2O_3$ which constitute gahnite.

As described above, $Na_2O$ and $K_2O$ cause abnormal growth of crystal grains in the substrate and deterioration in the orientation and, accordingly, these ingredients should not be contained in the substrate. The substrate should not contain PbO either because PbO is an undesirable ingredient from the viewpoint of environment protection.

Description will now be made about respective ingredients which constitute the substrate. First, as regards the glass-ceramic substrate containing, as a main crystal phase or phases, one or more crystal phases selected from the group consisting of β-quartz (β-$SiO_2$), β-quartz solid solution (β-$SiO_2$ solid solution), β-spodumene (β-$Li_2O.Al_2O_3.4SiO_2$), β-spodumene solid solution (β-$Li_2O.Al_2O_3.4SiO_2$ solid solution), β-eucryptite (β-$Li_2O.Al_2O_3.2SiO_2$, a part of $Li_2O$ being capable of being substituted by MgO and/or ZnO) and β-eucryptite solid solution (β-$Li_2O.Al_2O_3.2SiO_2$ solid solution, a part of $Li_2O$ being capable of being substituted by MgO and/or ZnO) and β-eucryptite solid solution (β-$Li_2O.Al_2O_3.2SiO_2$ solid solution, a part of $Li_2O$ being capable of being substituted by MgO and/or ZnO), the $SiO_2$ ingredient is a very important ingredient for forming these crystal phases as a main crystal phase or phases. If the amount of this ingredient is below 50%, the crystal phase grown in the glass-ceramic is instable and their texture tends to become too rough and, as a result, the mechanical strength of the substrate is reduced and the surface roughness after polishing becomes large. If the amount of this ingredient exceeds 62%, difficulty arises in melting and forming the base glass and homogeneity of the substrate is reduced. A preferable range of this ingredient is 53–57% and a more preferable range thereof is 54–56%.

The $P_2O_5$ ingredient is effective for improving the melting and refining properties of the base glass when it coexists with the $SiO_2$ ingredient. If the amount of this ingredient is below 5%, these effects cannot be obtained whereas if the amount of this ingredient exceeds 10%, resistance to devitrification is reduced and, as a result, the texture of the glass-ceramic in the crystallization stage becomes too rough and the mechanical strength of the substrate is reduced. A preferable range of this ingredient is 6–10% and a more preferable range thereof is 7–9%.

For achieving the above effects more significantly, it is preferable to include $SiO_2+P_2O_5$ in the amount of 61–65% with the ratio of $P_2O_5/SiO_2$ within a range from 0.12 to 0.16.and it is more preferable to include $SiO_2+P_2O_5$ in the amount of 62–64% with the ratio of $P_2O_5/SiO_2$ within a range from 0.13 to 0.15.

If the amount of the $Al_2O_3$ ingredient is below 22%, difficulty arises in melting of the base glass and, accordingly, homogeneity of the glass-ceramic obtained is reduced and chemical durability of the glass-ceramic is deteriorated. If the amount of this ingredient exceeds 26%, difficulty also arises in melting of the base glass and, as a result, homogeneity is reduced and resistance to devitrification of the base glass is reduced and, as result, the texture of the glass-ceramic becomes too rough in the crystallization stage and the mechanical strength of the substrate is reduced. A preferable range of this ingredient is 23–26% and a more preferable range thereof is 23–25%.

The $Li_2O$, MgO and ZnO ingredients are important ingredients for forming β-quartz, β-spodumene, β-spodumene solid solution, β-eucryptite, and β-eucryptite solid solution. These three ingredients are important also in that, by coexistence of the above described $SiO_2$ and $P_2O_5$ ingredients, these three ingredients improve the low expansion characteristic, reduce the amount of flexion at a high temperature and significantly improve melting and refining properties of the base glass.

If the amount of the $Li_2O$ ingredient is below 3%, the above described effect cannot be obtained and, moreover, homogeneity is reduced as a result of reduction of the melting property and growth of a desired crystal phase becomes difficult. If the amount of this ingredient exceeds 5%, the low expansion characteristic cannot be obtained and resistance to devitrification of the base glass is reduced which causes the texture of the glass-ceramic to become too rough in the crystallization stage with resulting decrease in the mechanical strength. A preferable range of this ingredient is 3.5–5% and a more preferable range thereof is 3.5–4.5%.

If the amount of the MgO ingredient is below 0.5%, the above described effect cannot be obtained whereas if the amount of this ingredient exceeds 2%, the low expansion characteristic cannot be obtained. A preferable range of this ingredient is 0.5–1.8% and a more preferable range thereof is 0.6–1.5%.

If the amount of the ZnO ingredient is below 0.2%, the above described effect cannot be obtained whereas if the amount of this ingredient exceeds 2%, the low expansion characteristic cannot be obtained and, moreover, resistance to devitrification of the base glass is reduced and, as a result, the texture of the glass-ceramic becomes too rough in the crystallization stage and the mechanical strength thereby is reduced. A preferable range of this ingredient is 0.2–1.8% and a more preferable range thereof is 0.2–1.5%.

For achieving the above described effects more significantly, the total amount of the three ingredients of $Li_2O$, MgO and ZnO should be within a range from 4.0% to 6.5% and, preferably within a range from 4.3% to 6.5% and, more preferably, within a range from 4.5% to 6.5%.

The two ingredients of CaO and BaO are ingredients which remain as a glass matrix other than the crystal in the glass-ceramic. These ingredients are important for fine adjustment of the cyrstal phase and the glass matrix phase for improving the above described low expansion characteristic and melting property. If the amount of CaO is below 0.3%, this effect cannot be obtained whereas if the amount of this ingredient exceeds 4$, a desired crystal phase cannot be obtained and, moreover, resistance to devitrification of the base glass is reduced and, as a result, the texture of the glass-ceramic becomes too rough in the crystallization stage with resulting decrease in the mechanical strength. A preferable range of this ingredient is 0.5–3% and a more preferable range thereof is 0.5–2%.

If the amount of the BaO ingredient is below 0.5%, the above effect cannot be obtained whereas if the amount of this ingredient exceeds 4%, resistance to devitrification of the base glass is reduced and, as a result, the texture of the glass-ceramic becomes too rough in the crystallization stage with resulting decrease in the mechanical strength. A preferable range of this ingredient is 0.5–3% and a more preferable range thereof is 0.5–2%.

For improving the above described effects more significantly, the total amount of CaO+BaO should be within a range from 0.8% to 5% and, preferably within a range from 1% to 4% and, more preferably, within a range from 1% to 3%.

The $TiO_2$ and $ZrO_2$ ingredients are indispensable as nucleating agents. If the amount of each ingredient is below 1%, a desired crystal cannot be grown whereas if the amount of each ingredient exceeds 4%, the melting property of the base glass is reduced and homogeneity thereby is reduced and, in the worst case, an unmolten ingredient is left in the glass-ceramic. A preferable range is 1.5–4% for $TiO_2$ and 1.5–3.5% for $ZrO_2$ and a more preferable range is 1.5–3.5% for $TiO_2$ and 1–3% for $ZrO_2$.

The $As_2O_3$ and $Sb_2O_3$ ingredients may be added as a refining agent in melting the materials of the glass for obtaining a homogeneous product. It will suffice if one or both of these ingredients are added up to the total amount of 4%. A preferable amount of $As_2O_3+Sb_2O_3$ is 0–2% and, more preferably $As_2O_3$ in the amount of 0–2%., For achieving fine adjustment of the properties of the glass-ceramic or other purpose, one or more of SrO, $B_2O_3$, $F_2$, $La_2O_3$, $Bi_2O_3$, $WO_3$, $Y_2O_3$, $Gd_2O_3$ and $SnO_2$ ingredients may be added in the total amount of 2% or below in addition to the above described ingredients. One or more of coloring agents such as CoO, NiO, $MnO_2$, $Fe_2O_3$ and $Cr_2O_3$ may also be added in the total amount of 2% or below.

As to the glass-ceramic substrate containing, as a main crystal phase, gahnite and/or gahnite solid solution provided in another aspect of the invention, if the $SiO_2$ ingredient is below 30%, crystal grains tend to become coarse and chemical durability and mechanical strength are reduced whereas if the amount of this ingredient exceeds 65%, difficulty arises in melting of the base glass and homogeneity thereby is reduced. A preferable range of this ingredient is 32–63% and a more preferable range thereof is 34–61%.

If the amount of the $Al_2O_3$ ingredient is below 5%, difficulty arises in the growth of gahnite as a main crystal phase whereas if the amount of this ingredient exceeds 35%, decrease in homogeneity due to deterioration in the melting property occurs and resistance to devitrification is reduced and, as a result, the texture of the glass-ceramic becomes too rough in the crystallization stage with resulting decrease in the mechanical strength. A preferable range of this amount is 7–33% and a more preferable range thereof is 10–30%.

The ZnO ingredient is an important ingredient for forming, together with the $Al_2O_3$ ingredient, gahnite as a main crystal phase and for improving the mechanical strength and heat resistance property. If the amount of this ingredient is below 5%, the above effects cannot be obtained whereas if the amount of this ingredient exceeds 35%, resistance to devitrification of the base glass is reduced and, as a result, the texture of the glass-ceramic becomes too rough in the crystallization stage with resulting decrease in the mechanical strength. A preferable range of this ingredient is 7–33% and a more preferable range thereof is 10–30%.

If the amount of the MgO ingredient is below 1%, homogeneity is reduced due to deterioration in the melting property of the base glass and, as a result, the texture of the glass-ceramic becomes too rough in the crystallization stage with resulting decrease in the mechanical strength. If the amount of this ingredient exceeds 20%, resistance to devitrification of the base glass is reduced. A preferable range of this ingredient is 3–18% and a more preferable range thereof is 3–15%.

The CaO, SrO, BaO, $B_2O_3$, $La_2O_3$, $Y_2O_3$, $Gd_2O_3$, $Ta_2O_5$, $Nb_2O_5$, $WO_3$ and $Bi_2O_3$ ingredients are effective for improving the melting property of the base glass. Particularly, the $La_2O_3$, $Y_2O_3$, $Gd_2O_3$, $Ta_2O_5$, $Nb_2O_5$, $WO_3$ and $Bi_2O_3$ ingredients are also effective for improving the mechanical strength and chemical durability of the product. For achieving these effects while preventing the grown crystal phase from becoming too rough in the heating process, the total amount of one or more of these ingredients should be within a range from 0.5% to 20%. If, however, the amount of the $B_2O_3$ ingredient exceeds 10% or if the total amount of one or more of the $Ta_2O_5$, $Nb_2O_5$, $WO_3$ and $Bi_2O_3$ ingredients exceeds 10%, difficulty arises in the growth of a desired crystal phase. The total amount of $CaO+SrO+BaO+B_2O_3+La_2O_3+Y_2O_3+Gd_2O_3+Ta_2O_5+Nb_2O_5+WO_3+Bi_2O_3$ should preferably be within a range from 0.5% to 15%, the amount of $B_2O_3$ should preferably be within a range from 0% to 8% and the total amount of $Ta_2O_5+Nb_2O_5+WO_3+Bi_2O_3$ should preferably be within a range from 0% to 5%. A more preferable range of the total amount of $CaO+SrO+BaO+B_2O_3+La_2O_3+Y_2O_3+Gd_2O_3+Ta_2O_5+Nb_2O_5+WO_3+Bi_2O_3$ is 0.5–10%, a more preferable range of the $Bi_2O_3$ ingredient is 0–5% and a more preferable range of the total amount of $Ta_2O_5+Nb_2O_5+WO_3+Bi_2O_3$ is 0–5%.

The $TiO_2$ ingredient is indispensable as a nucleating agent. If the amount of this ingredient is below 1%, a desired crystal phase cannot be grown whereas if the amount of this ingredient exceeds 15%, resistance to devitrification of the base glass is reduced and, as a result, the texture of the glass-ceramic becomes too rough in the crystallization stage with resulting decrease in the mechanical strength. A preferable range of this ingredient is 3–13% and a more preferable range thereof is 4–10%.

The $ZrO_2$, $P_2O_5$ and $SnO_2$ ingredients may be added as an auxiliary nucleating agent. If the total amount of one or more of these ingredients exceeds 7%, and if the amount of the respective ingredients exceeds 2%, 5% and 2%, resistance to devitrification of the base glass is reduced and, as a result, the texture of the glass-ceramic becomes too rough in the crystallization stage with resulting decrease in the mechanical strength. A preferable total amount of $ZrO_2+P_2O_5+SnO_2$ is 6% or below, the amount of $ZrO_2$ is below 1.8%, the amount of $P_2O_5$ is 4.5% or below and the amount of $SnO_2$ is 1.8% or below. A more preferable total amount of $ZrO_2+P_2O_5+SnO_2$ is 5% or below, the amount of $ZrO_2$ is below 1.7%, the amount of $P_2O_5$ is 4% or below and the amount of $SnO_2$ is 1.7% or below.

The $As_2O_3$ and/or $Sb_2O_3$ ingredients may be added as a refining agent in melting of the base glass. It will suffice if one or both of these ingredients are added up to the total amount of 4%. A preferable total amount is 3% or below and a more preferable total amount is 2% or below.

If one or more fluorides of the above ingredients are contained in the substrate, it will be effective for melting of the base glass and adjusting crystallization. If the total amount of F of these fluorides exceeds 5%, the tendency to devitrification increases and a good product cannot be obtained.

In addition to the above described ingredients, coloring agents such as $MnO_2$, NiO, CoO, $Fe_2O_3$, $Cr_2O_3$, $V_2O_5$, $MoO_2$ and $Cu_2O$, and $GeO_2$ and other rare earth oxide than the above described ones may be added in the total amount of one or more of these ingredients up to 10% within a range which will not impair the desired properties of the product.

In each of the above described glass-ceramic substrates of the two systems according to the invention, the total amount of the above described ingredients should be 90% or over, preferably 95% or, more preferably 98%, for providing an excellent glass-ceramic substrate.

For manufacturing each of the glass-ceramic substrate for a magnetic information recording medium of the two systems according to the invention, the base glass having the above described composition is melted, is subjected to heat forming and/or cold forming, is heat treated for producing a crystal nucleus under a temperature within a range from 650° C. to 750° C. for about one to twelve hours, and further is heat treated for crystallization under a temperature within a range from 750° C. to 950° C. for about one to twelve hours.

EXAMPLES

Examples of the present invention will now be described.

Tables 1 to 11, show examples (No. 1, 3 to 50) of compositions of the glass-ceramic ceramic substrate for a magnetic information recording medium made according to the invention together with the temperature of nucleation, temperature of crystallization, crystal phase, crystal grain diameter, surface roughness (Ra) and maximum surface roughness (Rmax) after polishing, flatness of the substrate after heating test for the substrate, flatness of the magnetic information recording disk after film forming under the condition that the substrate is heated to a high temperature of 500° C. or over (with respect to Examples 1, 24 and 25, annealing was made at 800° C. for ten minutes after the film forming), and a coefficient of thermal expansion (−60° C. to +600° C). Table 12 shows compositions and the above properties of the prior art chemically tempered glass (Comparative Example 1) of a $Al_2O_3$—$SiO_2$ system and the prior art glass-ceramic (Comparative Example No. 2) of a $Li_2O$—$SiO_2$ system. The present invention, however, is not limited to the examples of Tables 1 to 11. The flatness of the substrate was measured by using an untreated disk substrate having a diameter of 65 mm and a disk thickness of 0.635 mm and by measuring of the substrate after the heating test or film forming with a touch needle type measuring instrument. In the tables, β-quartz is abbreviated as β-Q, β-quartz solid solution as β-Q-SS, β-spodumene as β-Sp, β-spodumene solid solution as β-Sp-SS, β-eucryptite as β-Eu, β-eucryptite solid solution as β-Eu-SS, gahnite as Ga and gahnite solid solution as Ga-SS.

TABLE 2

| | Examples | | | | |
|---|---|---|---|---|---|
| | 6 | 7 | 8 | 9 | 10 |
| SiO$_2$ | 59.0 | 53.9 | 54.3 | 54.0 | 55.0 |
| P$_2$O$_5$ | 5.5 | 9.5 | 7.8 | 8.0 | 7.8 |
| Al$_2$O$_3$ | 24.0 | 22.8 | 22.5 | 25.8 | 23.0 |
| Li$_2$O | 4.7 | 3.0 | 3.4 | 3.4 | 3.2 |
| MgO | 0.8 | 0.7 | 1.7 | 1.4 | 0.7 |
| ZnO | 0.5 | 1.7 | 0.5 | 0.3 | 0.6 |
| CaO | 0.4 | 0.4 | 0.9 | 1.5 | 0.6 |
| BaO | 0.6 | 0.7 | 1.7 | 1.2 | 3.0 |
| TiO$_2$ | 1.3 | 3.2 | 1.9 | 2.2 | 1.4 |
| ZrO$_2$ | 1.3 | 1.5 | 1.5 | 1.3 | 2.2 |
| As$_2$O$_3$ | 0.4 | 1.4 | 0.3 | 0.4 | 2.5 |
| Sb$_2$O$_3$ | 1.5 | 1.2 | 3.5 | 0.5 | |
| V$_2$O$_5$ | | | | | |
| CoO | | | | | |
| Nucleation temperature (° C.) | 680 | 650 | 680 | 700 | 740 |
| Crystallization temperature (° C.) | 950 | 760 | 780 | 820 | 850 |
| Main crystal phases and grain diameter | β-Q-SS 0.01 β-Eu-SS 0.010 | β-Q-SS 0.001 | β-Q 0.010 | β-Q-SS 0.001 | β-Q 0.001 |
| Substrate heating temperature (° C.) | 800 | 900 | 600 | 800 | 850 |
| Holding time (min.) | 10 | 5 | 10 | 10 | 10 |
| Flatness (μm) after heating | 0.01 | 0.01 | 0.01 | 0.01 | 0.10 |
| Temperature of the substrate during film forming | 800 | 900 | 600 | 800 | 800 |
| Flatness (μm) after film forming | 0.01 | 0.01 | 0.01 | 0.01 | 0.05 |
| Surface roughness (Ra) | 3.8 | 1.5 | 3.0 | 1.0 | 4.5 |
| Maximum surface roughness (Rmax) | 40 | 15 | 35 | 12 | 55 |
| Coefficient of thermal expansion (10$^{-7}$/° C.) (−60° C. − +600° C.) | 4 | −5 | 10 | 8 | 2 |

TABLE 3

| | Examples | | | | |
|---|---|---|---|---|---|
| | 11 | 12 | 13 | 14 | 15 |
| SiO$_2$ | 54.0 | 54.3 | 55.1 | 56.0 | 55.3 |
| P$_2$O$_5$ | 8.1 | 7.7 | 7.2 | 8.0 | 8.2 |
| Al$_2$O$_3$ | 22.7 | 25.4 | 24.8 | 24.1 | 24.5 |
| Li$_2$O | 4.9 | 3.5 | 3.5 | 3.4 | 3.2 |
| MgO | 0.6 | 0.5 | 1.8 | 0.6 | 0.9 |
| ZnO | 0.5 | 0.4 | 0.6 | 0.2 | 1.9 |
| CaO | 3.4 | 0.3 | 0.5 | 0.4 | 0.5 |
| BaO | 1.5 | 0.8 | 1.1 | 0.7 | 0.7 |
| TiO$_2$ | 1.9 | 2.0 | 1.2 | 1.7 | 1.3 |
| ZrO$_2$ | 1.9 | 1.5 | 1.3 | 1.3 | 1.5 |
| As$_2$O$_3$ | 0.3 | 3.2 | 0.1 | 3.6 | 1.8 |
| Sb$_2$O$_3$ | 0.2 | 0.4 | 2.8 | | 0.2 |
| V$_2$O$_5$ | | | | | |
| CoO | | | | | |
| Nucleation temperature (° C.) | 680 | 750 | 650 | 650 | 680 |
| Crystallization temperature (° C.) | 800 | 900 | 750 | 920 | 780 |
| Main crystal phases and grain diameter | β-Q-SS 0.010 β-Eu-SS 0.010 | β-Q-SS 0.010 | β-Q-SS 0.010 β-Sp-SS 0.050 | β-Q-SS 0.010 β-Eu-SS 0.010 | β-Q-SS 0.010 |
| Substrate heating temperature (° C.) | 800 | 500 | 550 | 500 | 580 |
| Holding time (min.) | 10 | 10 | 10 | 10 | 10 |
| Flatness (μm) after heating | 0.10 | 0.01 | 0.10 | 0.10 | 0.10 |
| Temperature of the substrate during film forming | 800 | 500 | 600 | 500 | 600 |
| Flatness (μm) after film forming | 0.10 | 0.01 | 0.10 | 0.10 | 0.10 |
| Surface roughness (Ra) | 1.8 | 2.0 | 5.0 | 4.5 | 3.0 |
| Maximum surface roughness (Rmax) | 20 | 35 | 60 | 50 | 35 |
| Coefficient of thermal expansion (10$^{-7}$/° C.) (−60° C. − +600° C.) | 1 | 1 | 10 | 2 | −8 |

TABLE 4

| | Examples | | | | |
|---|---|---|---|---|---|
| | 16 | 17 | 18 | 19 | 20 |
| SiO$_2$ | 55.2 | 56.8 | 55.9 | 54.1 | 55.6 |
| P$_2$O$_5$ | 7.7 | 6.8 | 8.1 | 8.0 | 8.2 |
| Al$_2$O$_3$ | 22.7 | 22.7 | 23.2 | 24.0 | 22.8 |
| Li$_2$O | 4.2 | 4.4 | 3.4 | 3.5 | 3.7 |
| MgO | 1.0 | 1.3 | 0.8 | 0.7 | 0.7 |
| ZnO | 1.0 | 0.5 | 1.5 | 0.7 | 0.4 |
| CaO | 0.3 | 3.9 | 0.7 | 0.7 | 3.2 |
| BaO | 3.3 | 0.6 | 0.5 | 4.0 | 1.1 |
| TiO$_2$ | 1.8 | 1.3 | 1.3 | 1.5 | 1.1 |
| ZrO$_2$ | 1.8 | 1.2 | 1.5 | 1.5 | 1.2 |
| As$_2$O$_3$ | | | 1.7 | 1.3 | 2.0 |
| Sb$_2$O$_3$ | 1.0 | 0.5 | 1.4 | | |
| V$_2$O$_5$ | | | | | |
| CoO | | | | | |
| Nucleation temperature (° C.) | 720 | 700 | 750 | 750 | 660 |
| Crystallization temperature (° C.) | 850 | 760 | 860 | 770 | 760 |
| Main crystal phases and grain diameter | β-Q 0.007 | β-Q-SS 0.010 β-SP-SS 0.010 | β-Q-SS 0.001 | β-Q 0.007 | β-Q-SS 0.001 β-Eu-SS 0.010 |
| Substrate heating temperature (° C.) | 800 | 500 | 600 | 700 | 500 |
| Holding time (min.) | 10 | 10 | 10 | 10 | 10 |
| Flatness (μm) after heating | 0.10 | 0.10 | 0.10 | 0.10 | 0.10 |
| Temperature of the substrate during film forming | 800 | 500 | 600 | 700 | 500 |
| Flatness (μm) after film forming | 0.10 | 0.10 | 0.10 | 0.10 | 0.10 |
| Surface roughness (Ra) | 1.5 | 4.5 | 2.0 | 1.8 | 4.8 |
| Maximum surface roughness (Rmax) | 18 | 60 | 30 | 24 | 60 |
| Coefficient of thermal expansion (10$^{-7}$/° C.) (−60° C. − +600° C.) | 7 | 7 | 2 | 6 | 7 |

TABLE 5

|  | Examples | | |
| --- | --- | --- | --- |
|  | 21 | 22 | 23 |
| SiO$_2$ | 57.8 | 59.9 | 55.1 |
| P$_2$O$_5$ | 7.6 | 8.7 | 8.2 |
| Al$_2$O$_3$ | 22.7 | 22.7 | 23.0 |
| Li$_2$O | 3.1 | 3.1 | 3.4 |
| MgO | 0.6 | 0.6 | 0.8 |
| ZnO | 0.3 | 0.3 | 0.7 |
| CaO | 0.4 | 0.4 | 2.0 |
| BaO | 0.6 | 0.6 | 0.7 |
| TiO$_2$ | 3.8 | 1.3 | 1.3 |
| ZrO$_2$ | 1.1 | 1.0 | 4.0 |
| As$_2$O$_3$ |  |  |  |
| Sb$_2$O$_3$ | 2.0 | 1.4 | 0.8 |
| V$_2$O$_5$ |  |  |  |
| CoO |  |  |  |
| Nucleation temperature (° C.) | 650 | 680 | 740 |
| Crystallization temperature (° C.) | 750 | 800 | 940 |
|  | β-Q-SS | β-Q-SS | β-Q-SS |
| Main crystal phases and grain diameter | 0.001 | 0.001 | 0.001 |
|  |  | β-Sp-SS 0.010 |  |
| Substrate heating temperature (° C.) | 850 | 700 | 900 |
| Holding time (min.) | 10 | 10 | 5 |
| Flatness (μm) after heating | 0.10 | 0.10 | 0.10 |
| Temperature of the substrate during film forming | 800 | 700 | 900 |
| Flatness (μm) after film forming | 0.05 | 0.10 | 0.10 |
| Surface roughness (Ra) | 1.5 | 4.1 | 2.5 |
| Maximum surface roughness (Rmax) | 18 | 58 | 30 |
| Coefficient of thermal expansion (10$^{-7}$/° C.) (−60° C. − +600° C.) | 5 | 4 | 0 |

TABLE 6

|  | Examples | | | | |
| --- | --- | --- | --- | --- | --- |
|  | 24 | 25 | 26 | 27 | 28 |
| SiO$_2$ | 55.0 | 54.0 | 54.0 | 30.5 | 64.8 |
| Al$_2$O$_3$ | 18.5 | 18.0 | 18.0 | 20.0 | 12.0 |
| ZnO | 12.0 | 12.5 | 12.0 | 9.0 | 7.5 |
| MgO | 6.0 | 5.0 | 7.0 | 15.0 | 11.3 |
| TiO$_2$ | 6.0 | 4.5 | 5.0 | 3.0 | 1.7 |
| B$_2$O$_3$ |  | 2.5 |  | 7.5 |  |
| ZrO$_2$ |  | 1.0 |  |  |  |
| P$_2$O$_5$ |  |  |  | 1.0 |  |
| SnO$_2$ |  |  |  |  |  |
| CaO |  |  | 1.5 | 12.0 |  |
| SrO |  |  |  |  | 1.7 |
| BaO | 2.0 | 1.0 |  |  |  |
| La$_2$O$_3$ |  |  |  |  |  |
| Y$_2$O$_3$ |  |  | 1.0 |  |  |
| Gd$_2$O$_3$ |  |  |  |  |  |
| Ta$_2$O$_5$ |  |  | 1.0 |  |  |
| Nb$_2$O$_5$ |  |  |  |  |  |
| WO$_3$ |  |  |  |  |  |
| Bi$_2$O$_3$ |  |  |  |  |  |
| V$_2$O$_5$ |  | 1.0 |  |  |  |
| As$_2$O$_3$ | 0.5 | 0.5 | 0.5 | 1.0 | 0.5 |
| Sb$_2$O$_3$ |  |  |  | 1.0 | 0.5 |
| Nucleation temperature (° C.) | 690 | 700 | 720 | 650 | 740 |
| Crystallization temperature (° C.) | 800 | 900 | 850 | 760 | 940 |
|  | Ga | Ga | Ga | Ga-SS | Ga-SS |
| Main crystal phases and grain diameter | 0.005 | 0.007 | 0.010 | 0.005 | 0.007 |

TABLE 6-continued

|  | Examples | | | | |
| --- | --- | --- | --- | --- | --- |
|  | 24 | 25 | 26 | 27 | 28 |
| Substrate heating temperature (° C.) | 800 | 800 | 600 | 600 | 900 |
| Holding time (min.) | 10 | 10 | 10 | 10 | 5 |
| Flatness (μm) after heating | 0.10 | 0.10 | 0.10 | 0.10 | 0.10 |
| Temperature of the substrate during film forming | 800 | 800 | 600 | 600 | 900 |
| Flatness (μm) after film forming | 0.10 | 0.10 | 0.10 | 0.10 | 0.10 |
| Surface roughness (Ra) | 1.5 | 2.9 | 2.2 | 3.8 | 2.0 |
| Maximum surface roughness (Rmax) | 25.5 | 31 | 27.3 | 42 | 35 |
| Coefficient of thermal expansion (10$^{-7}$/° C.) (−60° C. − +600° C.) | 49 | 55 | 65 | 70 | 33 |

TABLE 7

|  | Examples | | | | |
| --- | --- | --- | --- | --- | --- |
|  | 29 | 30 | 31 | 32 | 33 |
| SiO$_2$ | 60.0 | 31.5 | 55.0 | 37.0 | 50.0 |
| Al$_2$O$_3$ | 5.2 | 34.8 | 5.6 | 8.5 | 28.2 |
| ZnO | 10.0 | 20.0 | 5.3 | 34.5 | 10.0 |
| MgO | 2.5 | 4.5 | 2.0 | 5.5 | 1.1 |
| TiO$_2$ | 13.5 | 2.0 | 11.4 | 4.5 | 1.8 |
| B$_2$O$_3$ |  |  |  | 0.8 |  |
| ZrO$_2$ |  | 0.5 | 1.5 | 0.7 |  |
| P$_2$O$_5$ | 2.5 |  | 3.8 | 0.5 |  |
| SnO$_2$ |  |  | 0.9 |  |  |
| CaO |  |  |  |  | 5.0 |
| SrO |  | 5.5 |  |  |  |
| BaO | 6.0 |  | 13.0 |  |  |
| La$_2$O$_3$ |  |  |  | 2.5 |  |
| Y$_2$O$_3$ |  |  |  |  |  |
| Gd$_2$O$_3$ |  |  |  | 1.0 | 6.9 |
| Ta$_2$O$_5$ |  |  |  |  |  |
| Nb$_2$O$_5$ | 0.3 |  |  |  |  |
| WO$_3$ |  |  |  |  |  |
| Bi$_2$O$_3$ |  | 0.7 |  |  |  |
| V$_2$O$_5$ |  |  |  |  |  |
| As$_2$O$_3$ |  |  |  | 0.5 |  |
| Sb$_2$O$_3$ |  | 0.5 |  | 0.5 | 2.0 |
| Nucleation temperature (° C.) | 670 | 650 | 650 | 650 | 750 |
| Crystallization temperature (° C.) | 850 | 750 | 830 | 900 | 800 |
|  | Ga-SS | Ga-SS | Ga-SS | Ga-SS | Ga-SS |
| Main crystal phases and grain diameter | 0.004 | 0.001 | 0.001 | 0.010 | 0.001 |
| Substrate heating temperature (° C.) | 800 | 700 | 800 | 900 | 800 |
| Holding time (min.) | 10 | 10 | 10 | 5 | 10 |
| Flatness (μm) after heating | 0.10 | 0.10 | 0.10 | 0.10 | 0.10 |
| Temperature of the substrate during film forming | 800 | 700 | 800 | 900 | 800 |
| Flatness (μm) after film forming | 0.10 | 0.10 | 0.10 | 0.10 | 0.10 |
| Surface roughness (Ra) | 4.8 | 2.0 | 1.5 | 5.0 | 2.0 |
| Maximum surface roughness (Rmax) | 60 | 24 | 21 | 80 | 30 |
| Coefficient of thermal expansion (10$^{-7}$/° C.) (−60° C. − +600° C.) | 55 | 80 | 60 | 75 | 51 |

TABLE 8

| | Examples | | | | |
|---|---|---|---|---|---|
| | 34 | 35 | 36 | 37 | 38 |
| SiO$_2$ | 40.0 | 45.0 | 49.0 | 48.5 | 57.2 |
| Al$_2$O$_3$ | 25.0 | 15.0 | 17.0 | 22.5 | 25.5 |
| ZnO | 8.0 | 15.0 | 6.9 | 6.0 | 8.3 |
| MgO | 19.5 | 18.0 | 3.0 | 3.1 | 1.5 |
| TiO$_2$ | 2.0 | 1.0 | 15.0 | 3.1 | 1.5 |
| B$_2$O$_3$ | | | | 9.8 | |
| ZrO$_2$ | | 1.7 | 0.5 | | 1.8 |
| P$_2$O$_5$ | 1.5 | | | 0.1 | |
| SnO$_2$ | | | 0.1 | | |
| CaO | | | 2.5 | | |
| SrO | | | | | 0.5 |
| BaO | | 1.3 | | 0.7 | |
| La$_2$O$_3$ | | | | | |
| Y$_2$O$_3$ | 3.0 | | | | |
| Gd$_2$O$_3$ | | | | | 0.2 |
| Ta$_2$O$_5$ | | | | | |
| Nb$_2$O$_5$ | | | 4.0 | | |
| WO$_3$ | | | | | |
| Bi$_2$O$_3$ | | | | 2.7 | |
| V$_2$O$_5$ | | | | | |
| As$_2$O$_3$ | 0.5 | | 2.0 | | 3.5 |
| Sb$_2$O$_3$ | 0.5 | 3.0 | | 3.5 | |
| Nucleation temperature (° C.) | 700 | 700 | 650 | 650 | 700 |
| Crystallization temperature (° C.) | 850 | 850 | 750 | 750 | 890 |
| Main crystal phases and grain diameter | Ga-SS 0.001 | Ga 0.001 Ga-SS 0.001 | Ga-SS 0.001 | Ga-SS 0.050 | Ga-SS 0.001 |
| Substrate heating temperature (° C.) | 850 | 850 | 700 | 650 | 850 |
| Holding time (min.) | 10 | 10 | 10 | 10 | 10 |
| Flatness (μm) after heating | 0.20 | 0.10 | 0.10 | 0.10 | 0.10 |
| Temperature of the substrate during film forming | 800 | 800 | 700 | 700 | 800 |
| Flatness (μm) after film forming | 0.15 | 0.10 | 0.10 | 0.10 | 0.10 |
| Surface roughness (Ra) | 4.0 | 2.0 | 4.8 | 5.0 | 2.0 |
| Maximum surface roughness (Rmax) | 70 | 18 | 75 | 85 | 31 |
| Coefficient of thermal expansion (10$^{-7}$/° C.) (−60° C. − +600° C.) | 66 | 78 | 80 | 48 | 58 |

TABLE 9

| | Examples | | | | |
|---|---|---|---|---|---|
| | 39 | 40 | 41 | 42 | 43 |
| SiO$_2$ | 33.0 | 34.8 | 43.0 | 38.0 | 36.0 |
| Al$_2$O$_3$ | 9.5 | 31.0 | 10.0 | 30.0 | 8.5 |
| ZnO | 31.5 | 28.0 | 19.5 | 7.0 | 25.0 |
| MgO | 9.5 | 1.3 | 1.9 | 1.7 | 8.0 |
| TiO$_2$ | 8.0 | 1.3 | 1.5 | 1.3 | 1.5 |
| B$_2$O$_3$ | | | | | |
| ZrO$_2$ | | | | | |
| P$_2$O$_5$ | 5.0 | | 0.8 | | |
| SnO$_2$ | | 2.0 | | | |
| CaO | | 0.4 | 19.8 | | |
| SrO | | | | 20.0 | |
| BaO | | | | | 19.5 |
| La$_2$O$_3$ | | | | | |
| Y$_2$O$_3$ | | 1.5 | | | |
| Gd$_2$O$_3$ | | | | | |
| Ta$_2$O$_5$ | 3.0 | | | | 0.5 |
| Nb$_2$O$_5$ | | | | | |
| WO$_3$ | | | | | |
| Bi$_2$O$_3$ | | | | | |
| V$_2$O$_5$ | | | | | |
| As$_2$O$_3$ | | | 0.5 | 2.0 | 1.0 |
| Sb$_2$O$_3$ | 0.5 | | 1.5 | 1.0 | 1.0 |
| Nucleation temperature (° C.) | 650 | 650 | 650 | 650 | 660 |
| Crystallization temperature (° C.) | 750 | 750 | 750 | 780 | 750 |
| Main crystal phases and grain diameter | Ga-SS 0.001 | Ga 0.001 Ga-SS 0.001 | Ga-SS 0.100 | Ga-SS 0.050 | Ga-SS 0.001 |
| Substrate heating temperature (° C.) | 700 | 600 | 600 | 700 | 700 |
| Holding time (min.) | 10 | 10 | 10 | 10 | 10 |
| Flatness (μm) after heating | 0.10 | 0.10 | 0.10 | 0.10 | 0.10 |
| Temperature of the substrate during film forming | 700 | 600 | 600 | 700 | 700 |
| Flatness (μm) after film forming | 0.10 | 0.10 | 0.10 | 0.10 | 0.10 |
| Surface roughness (Ra) | 4.0 | 1.5 | 5.0 | 1.8 | 2.1 |
| Maximum surface roughness (Rmax) | 80 | 18 | 80 | 27 | 28 |
| Coefficient of thermal expansion (10$^{-7}$/° C.) (−60° C. − +600° C.) | 80 | 80 | 80 | 38 | 78 |

TABLE 10

| | Examples | | | | |
|---|---|---|---|---|---|
| | 44 | 45 | 46 | 47 | 48 |
| SiO$_2$ | 32.0 | 35.0 | 55.5 | 35.5 | 40.2 |
| Al$_2$O$_3$ | 28.0 | 10.0 | 12.2 | 30.5 | 11.2 |
| ZnO | 12.0 | 25.0 | 6.4 | 6.1 | 6.5 |
| MgO | 4.0 | 6.2 | 2.5 | 1.6 | 16.0 |
| TiO$_2$ | 2.0 | 2.0 | 1.4 | 5.0 | 4.5 |
| B$_2$O$_3$ | | 0.2 | | | |
| ZrO$_2$ | | | | | |
| P$_2$O$_5$ | | | | | |
| SnO$_2$ | | | | | |
| CaO | | | | | |
| SrO | | | | | |
| BaO | | | | | 3.0 |
| La$_2$O$_3$ | 19.5 | | | | |
| Y$_2$O$_3$ | | 19.6 | | | |
| Gd$_2$O$_3$ | | | 19.5 | | |
| Ta$_2$O$_5$ | | | | 9.8 | |
| Nb$_2$O$_5$ | | | | | 9.5 |
| WO$_3$ | | 0.2 | | 8.0 | |
| Bi$_2$O$_3$ | | | | | 7.0 |
| V$_2$O$_5$ | | | | | |
| As$_2$O$_3$ | 2.5 | | | 3.5 | 2.1 |
| Sb$_2$O$_3$ | | 1.5 | 2.5 | | |
| Nucleation temperature (° C.) | 680 | 670 | 700 | 740 | 720 |
| Crystallization temperature (° C.) | 770 | 760 | 800 | 870 | 880 |
| Main crystal phases and grain diameter | Ga-SS 0.001 | Ga-SS 0.001 | Ga-SS 0.001 | Ga-SS 0.001 | Ga-SS 0.001 |
| Substrate heating temperature (° C.) | 750 | 750 | 800 | 850 | 850 |
| Holding time (min.) | 10 | 10 | 10 | 10 | 10 |
| Flatness (μm) after heating | 0.10 | 0.10 | 0.10 | 0.10 | 0.10 |
| Temperature of the substrate during film forming | 700 | 800 | 800 | 800 | 800 |

TABLE 10-continued

|  | Examples | | | | |
| --- | --- | --- | --- | --- | --- |
|  | 44 | 45 | 46 | 47 | 48 |
| Flatness (μm) after film forming | 0.10 | 0.10 | 0.10 | 0.10 | 0.10 |
| Surface roughness (Ra) | 4.0 | 2.5 | 1.0 | 3.0 | 2.0 |
| Maximum surface roughness (Rmax) | 48 | 38 | 17 | 35 | 28 |
| Coefficient of thermal expansion ($10^{-7}$/° C.) (−60° C. − +600° C.) | 76 | 37 | 61 | 48 | 51 |

TABLE 11

|  | Examples | |
| --- | --- | --- |
|  | 49 | 50 |
| $SiO_2$ | 50.8 | 52.0 |
| $Al_2O_3$ | 18.0 | 16.0 |
| ZnO | 5.8 | 9.8 |
| MgO | 2.8 | 2.0 |
| $TiO_2$ | 2.2 | 1.5 |
| $B_2O_3$ | | |
| $ZrO_2$ | | |
| $P_2O_5$ | | |
| $SnO_2$ | | |
| CaO | | |
| SrO | 2.0 | |
| BaO | | |
| $La_2O_3$ | | |
| $Y_2O_3$ | | |
| $Gd_2O_3$ | | |
| $Ta_2O_5$ | | 7.8 |
| $Nb_2O_5$ | 7.4 | |
| $WO_3$ | 9.5 | |
| $Bi_2O_3$ | | 9.5 |
| $V_2O_5$ | | |
| $As_2O_3$ | | 1.4 |
| $Sb_2O_3$ | 1.5 | |
| Nucleation temperature(° C.) | 710 | 700 |
| Crystallization temperature(° C.) | 950 | 900 |
| Main crystal phases | Ga-SS | Ga-SS |
| and grain diameter | 0.001 | 0.001 |
| Substrate heating temperature(° C.) | 900 | 880 |
| Holding time (min.) | 5 | 5 |
| Flatness(μm) after heating | 0.10 | 0.10 |
| Temperature of the substrate during film forming | 900 | 900 |
| Flatness(μm) after film forming | 0.10 | 0.10 |
| Surface roughness (Ra) | 3.0 | 1.5 |
| Maximum surface roughness(Rmax) | 40 | 21 |
| Coefficient of thermal expansion ($10^{-7}$/° C.) (−60° C. − +600° C.) | 80 | 54 |

TABLE 12

|  | Comparative Example | |
| --- | --- | --- |
|  | 1 | 2 |
| $SiO_2$ | 68.0 | 76.5 |
| $P_2O_5$ | | 2.0 |
| $Al_2O_3$ | 13.0 | 3.8 |
| $Li_2O$ | 8.0 | 10.5 |
| MgO | | 2.5 |
| ZnO | | 0.5 |
| CaO | | |
| BaO | | |
| $TiO_2$ | | |
| $ZrO_2$ | 6.0 | |
| $As_2O_3$ | 0.5 | |

TABLE 12-continued

|  | Comparative Example | |
| --- | --- | --- |
|  | 1 | 2 |
| $Sb_2O_3$ | | 0.2 |
| $V_2O_5$ | | |
| CoO | | |
| $Na_2O$ | 5.0 | |
| $K_2O$ | | 4.0 |
| Nucleation temperature(° C.) | | 540 |
| Crystallization temperature(° C.) | | 740 |
| Crystal phase | chemically tempered glass | lithium dislicate α-quartz |
| Substrate heating temperature(° C.) | 500 | 500 |
| Holding time (min.) | 10 | 10 |
| Flatness(μm) after heating | 10 or over | 10 |
| Temperature of the substrate during film forming | 500 | 550 |
| Flatness(μm) after film forming | 10 or over | 8 |
| Surface roughness (Ra) | 7.0 | 15.0 |
| Maximum surface roughness(Rmax) | 120 | 280 |
| Coefficient of thermal expansion ($10^{-7}$/° C.) (−60° C. − +600° C.) | 86 | 80 |

For manufacturing the glass-ceramic substrate of the above described examples, materials including oxides, carbonates and nitrates are mixed and molten in conventional melting apparatus at a temperature within the range from about 1400° C. to about 1500° C. The molten glass is stirred to homogenize it and thereafter formed into a disk shape and annealed to provide a formed glass. Then, this formed glass is subjected to heat treatment to produce the crystal nucleus under a temperature within the range from 650° C. to 750° C. for about one to twelve hours and then is subjected to further heat treatment under a temperature within the range from 750° C. to 950° C. for about one to twelve hours. Then, this glass-ceramic is lapped with lapping grains having average grain diameter ranging from 5 μm to 30 μm for about 10 minutes to 60 minutes and then is finally polished with cerium oxide having average grain diameter ranging from 0.5 μm to 2 μm for about 30 minutes to 60 minutes.

As shown in Tables 1–11, the glass-ceramics of the present invention have an excellent flatness with the grain diameter of the grown crystals ranging from 0.001 μm to 0.10 μm and surface roughness Ra after polishing ranging from 1 Å to 5 Å and maximum roughness Rmax of 50 Å or below.

The crystal phase or phases of the glass-ceramics of the present invention is one or more of β-quartz (β-$SiO_2$), β-quartz solid solution (β-$SiO_2$ solid solution), β-spodumene (β-$Li_2O.Al_2O_3.4SiO_2$), β-spodumene solid solution (β-$Li_2O.Al_2O_3$. $4SiO_2$ solid solution), β-eucryptite (β-$Li_2O.Al_2O_3.2SiO_2$, a part of $Li_2O$ being capable of being substituted by MgO and/or ZnO) and β-eucryptite solid solution (β-$Li_2O.Al_2O_3.2SiO_2$ solid solution, a part of $Li_2O$ being capable of being substituted by MgO and/or ZnO). In another aspect of the invention, a main crystal phase realizing the above described objective is gahnite ($ZnAl_2O_4$) and/or gahnite solid solution ($ZnAl_2O_4$ solid solution).

Flatness of the substrate after the heating test is 0.1 μm or below in all of the examples which satisfies the desired flatness (i.e., 5 μm or below, preferably 3 μm or below and more preferably 1 μm or below). Even when the substrate is heated to 500° C. or over, the flatness of the substrate maintains the desired flatness (5 μm or below, preferably 3 μm or below and more preferably 1 μm or below). Some of the examples show that they maintain the desired flatness even when they are heated at 600° C. for 10 minutes, 700° C. for 10 minutes and 800° C. for 10 minutes.

In forming the magnetic film, the following process is employed to form a film of a perpendicular magnetic recording medium on the substrate:

First, platinum is deposited as a primary layer on the substrate to the film thickness of 30 nm by rotating the substrate (24 rpm) with vacuum of $1.2 \times 10^{-7}$ Torr in a vacuum evaporation apparatus Then, a film of $BaFe_{12}O_{19}$ is formed as the magnetic film to the film thickness of 250 nm by using a RF magnetron sputtering device. Conditions of forming of the magnetic film are:

Target: Forming of $BaFe_{12}O_{19}$ by sintering
Total gas pressure: $2 \times 10^{-4}$ Torr
Partial gas pressure: $Xe:Ar:O_2 = 50:49:1$
Substrate temperature: 600, 700, 800° C. (500, 550° C. in the comparative examples)
Number of revolution of the substrate during film forming: 24 rpm
RF power density: 10.2 W/cm$^2$
Annealing (Examples 1, 24 and 25 only): 800° C., 10 minutes As described above, the glass-ceramic substrate according to the invention has an excellent heat resisting property and, therefore, when a perpendicular magnetic film made of an oxide (typically barium ferrite) is formed on the substrate under the condition that the substrate is heated to a high temperature of 500° C. or over, flatness of the perpendicular magnetic recording medium after film forming maintains the desired range (i.e. 5 μm or below, preferably 3 μm or below and more preferably 1 μm or below).

In the film forming process, any other apparatus than the one used in the embodiment of the invention which can produce a perpendicular magnetic film, such as a vacuum evaporation device, ion plating device, ion beam sputtering device, MBE device, a device using the PVD method, a device using the CVD method and a device using plasma, may be used.

The coefficient of thermal expansion obtained by the above described examples of the invention is within a preferred range from $2 \times 10^{-7}$ to $65 \times 10^{-7}$.

In contrast, as shown in Table 12, the prior art chemically tempered glass has been found to have a large maximum surface roughness Rmax after polishing and have a large amount of flexion (5 μm) of the substrate due to thermal deformation during the film forming under a high temperature, causes deformation during sputtering and, moreover, have difficulty in forming an excellent film for the reason that the ion of the $Na_2O$ ingredient contained in the glass diffuses into the magnetic film during the forming of the perpendicular magnetic film. The prior art glass-ceramic has been found to have large surface roughness (Ra) and maximum surface roughness (Rmax) after polishing and, moreover, like the chemically tempered glass, have diffusion of the ion of the $K_2O$ ingredient in the magnetic film during sputtering.

What is claimed is:

1. A glass-ceramic substrate for a magnetic information recording medium of a perpendicular magnetic recording system containing the main crystal phase or phases which consist of (1) one or more crystal phases selected from the group consisting of β-quartz ($β-SiO_2$), β-quartz solid solution ($β-SiO_2$ solid solution), β-spodumene ($β-Li_2O.Al_2O_3.4SiO_2$), β-spodumene solid solution ($β-Li_2O.Al_2O_3.4SiO_2$ solid solution), β-eucryptite ($β-Li_2O.Al_2O_3.2SiO_2$, a part of $Li_2O$ being capable of being substituted by MgO and/or ZnO) and β-eucryptite solid solution ($β-Li_2O.Al_2O_3.2SiO_2$ solid solution, a part of $Li_2O$ being capable of being substituted by MgO and/or ZnO), or alternatively (2) gahnite ($ZnAl_2O_4$) and/or gahnite solid solution ($ZnAl_2O_4$ solid solution) and having flatness of 1 μm or below in a state after the glass-ceramic substrate is heated to 500° C., held for five minutes and then cooled.

2. A glass-ceramic substrate as defined in claim 1 having a coefficient of thermal expansion within a range from $-10 \times 10^{-7}$/° C. to $+80 \times 10^{-7}$/° C. within a temperature range from −50° C. to +600° C.

3. A glass-ceramic substrate as defined in claim 1 having a surface roughness Ra (arithmetic mean roughness) within a range from 1 Å to 5 Å after polishing and Rmax (maximum roughness) of 100 Å or below after polishing.

4. A glass-ceramic substrate as defined in claim 1 wherein crystal grains of a crystal phase grown therein have a diameter within a range from 0.001 μm to 0.10 μm.

5. A glass-ceramic substrate as defined in claim 1 which is free of PbO, $Na_2O$ and $K_2O$.

6. A glass-ceramic substrate as defined in claim 1 provided by heat treating a base glass having a composition which consists in weight percent of:

| | |
|---|---|
| $SiO_2$ | 50–62% |
| $P_2O_5$ | 5–10% |
| $Al_2O_3$ | 22–26% |
| $Li_2O + MgO + ZnO$ | 4–6.5% |
| in which $Li_2O$ | 3–5% |
| MgO | 0.5–2% |
| ZnO | 0.2–2% |
| CaO + BaO | 0.8–5% |
| in which CaO | 0.3–4% |
| BaO | 0.5–4% |
| $TiO_2$ | 1–4% |
| $ZrO_2$ | 1–4% |
| $As_2O_3 + Sb_2O_3$ | 0–4% | and is substantially free of PbO, $Na_2O$ and $K_2O$, said glass-ceramic substrate containing, as a main crystal phase or phases, one or more crystal phases selected from the group consisting of β-quartz ($β-SiO_2$), β-quartz solid solution ($β-SiO_2$ solid solution), β-spodumene ($β-Li_2O.Al_2O_3.4SiO_2$), β-spodumene solid solution ($β-Li_2O.Al_2O_3.4SiO_2$ solid solution), β-eucryptite ($β-Li_2O.Al_2O_3.2SiO_2$, a part of $Li_2O$ being capable of being substituted by MgO and/or ZnO) and β-eucryptite solid solution ($β-Li_2O.Al_2O_3.2SiO_2$ solid solution, a part of $Li_2O$ being capable of being substituted by MgO and/or ZnO).

7. A glass-ceramic substrate as defined in claim 1 provided by heat treating a base glass having a composition which consists in weight percent of:

| | |
|---|---|
| $SiO_2$ | 30–65% |
| $Al_2O_3$ | 5–35% |
| ZnO | 5–35% |
| MgO | 1–20% |
| $TiO_2$ | 1–15% |
| $CaO + SrO + BaO + B_2O_3 + La_2O_3 + Y_2O_3 + Gd_2O_3 + Ta_2O_5 + Nb_2O_5 + WO_3 + Bi_2O_3$ | 0.5–20% |
| in which $B_2O_3$ | 0–10% |
| $Ta_2O_5 + Nb_2O_5 + WO_3 + Bi_2O_3$ | 0–10% |
| $ZrO_2 + P_2O_5 + SnO_2$ | 0–7% |
| in which $ZrO_2$ | 0 to less than 2% |
| $P_2O_5$ | 0–5% |

-continued

| | |
|---|---|
| SnO$_2$ | 0–2% |
| As$_2$O$_3$ + Sb$_2$O$_3$ | 0–4% | and is substantially free of PbO, Na$_2$O and K$_2$O, said glass ceramic substrate containing, as a main crystal phase, gahnite (ZnAl$_3$O$_4$) and/or gahnite solid solution (ZnAl$_3$O$_4$).

8. A glass-ceramic substrate as defined in claim 1 provided by melting glass materials, forming molten glass, annealing formed glass and heat treating the formed glass at a nucleation temperature within a range from 650° C. to 750° C. and a crystallization temperature within a range from 750° C. to 950° C., said glass-ceramic substrate having a coefficient of thermal expansion within a range from −10×10$^{-7}$/° C. to +20×10$^{-7}$/° C. within a temperature range from −50° C. to +600° C.

9. A glass-ceramic substrate as defined in claim 1 provided by melting glass materials, forming molten glass, annealing formed glass and heat treating the formed glass at a nucleation temperature within a range from 650° C. to 750° C. and a crystallization temperature within a range from 750° C. to 950° C., said glass-ceramic substrate having a coefficient of thermal expansion within a range from +35×10$^{-7}$/° C. to +80×10$^{-7}$/° C. within a temperature range from −50° C. to +600° C.

10. A magnetic information recording disk provided by forming a magnetic film on a glass-ceramic substrate as defined in claim 1 in a state where the glass-ceramic substrate is heated at a temperature within a range from 500° C. to 900° C. and annealing the glass-ceramic substrate if necessary, said magnetic information recording disk having flatness of 5 μm or below.

* * * * *